United States Patent
Huang

(10) Patent No.: US 7,513,260 B2
(45) Date of Patent: Apr. 7, 2009

(54) IN-SITU CONTINUOUS COKE DEPOSIT REMOVAL BY CATALYTIC STEAM GASIFICATION

(75) Inventor: He Huang, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 385 days.

(21) Appl. No.: 11/431,810

(22) Filed: May 10, 2006

(65) Prior Publication Data

US 2007/0261714 A1 Nov. 15, 2007

(51) Int. Cl.
*B08B 9/00* (2006.01)

(52) U.S. Cl. .............. 134/22.1; 134/22.11; 134/22.12; 134/22.13; 134/22.15; 134/22.16; 134/22.17; 134/26; 134/31; 134/36; 134/39; 134/41; 134/42; 208/48 AA

(58) Field of Classification Search ............ 134/22.1, 134/22.11, 22.12, 22.13, 22.15, 22.16, 22.17, 134/26, 31, 41, 36, 39, 42; 208/48 AA
See application file for complete search history.

(56) References Cited

U.S. PATENT DOCUMENTS

| | | | |
|---|---|---|---|
| 2,487,743 A * | 11/1949 | Trotter | 208/146 |
| 2,951,806 A * | 9/1960 | Walser | 208/167 |
| 3,694,346 A | 9/1972 | Blaser | |
| 3,726,791 A | 4/1973 | Kimberlin | |
| 3,759,676 A | 9/1973 | Lahn | |
| 3,803,023 A | 4/1974 | Hamner | |
| 4,325,815 A | 4/1982 | Metrailer | |
| 4,419,222 A * | 12/1983 | Grenoble et al. | 208/120.1 |
| 4,508,543 A | 4/1985 | Peter | |
| 4,558,027 A | 12/1985 | McKee et al. | |
| 4,609,456 A | 9/1986 | Deschamps et al. | |
| 4,720,289 A | 1/1988 | Vaugh et al. | |
| 5,820,747 A | 10/1998 | Lenglet et al. | |
| 6,585,883 B1 * | 7/2003 | Kelemen et al. | 208/48 AA |
| 2005/0274649 A1 * | 12/2005 | Spadaccini et al. | 208/177 |
| 2007/0261714 A1 * | 11/2007 | Huang | 134/22.1 |

FOREIGN PATENT DOCUMENTS

| | | |
|---|---|---|
| EP | 0 007 247 A1 | 1/1980 |
| EP | 0 032 283 A1 | 7/1981 |
| EP | 0 207 783 A2 | 1/1987 |
| EP | 0 550 401 A1 | 7/1993 |
| WO | WO 96/20255 | 7/1996 |

* cited by examiner

*Primary Examiner*—Sharidan Carrillo
(74) *Attorney, Agent, or Firm*—Kinney & Lange, P.A.

(57) ABSTRACT

A coke removal system removes coke deposits from the walls of a high temperature passage in which hydrocarbon fuel is present. The system includes a carbon-steam gasification catalyst and a water source. The carbon-steam gasification catalyst is applied to the walls of the high temperature passage. The water reacts with the coke deposits on the walls of the high temperature passage to remove the coke deposits from the walls of the high temperature passage by carbon-steam gasification in the presence of the carbon-steam gasification catalyst.

19 Claims, 5 Drawing Sheets

IN-SITU CONTINUOUS COKE DEPOSIT REMOVAL BY CATALYTIC STEAM GASIFICATION

BACKGROUND OF THE INVENTION

The present invention relates generally to the field of removing coke from high temperature hydrocarbon systems.

Thermal management is a significant challenge in advanced aircraft, rocket, and missile engines. Increasing aircraft speed and engine thrust-to-weight ratio results in large, simultaneous increases in heat load and temperature of the air available for cooling. Engine and vehicle cooling must therefore be accomplished by using the fuel as a cooling means. One method of cooling advanced engines is the application of high heat sink fuel cooling technology. Although cryogenic fuels, such as liquid methane and liquid hydrogen, can provide sufficient cooling, they present issues in the areas of cost, logistics, operations, and safety. By contrast, conventional liquid hydrocarbon fuels undergoing endothermic chemical cracking, catalytically and/or thermally, offer the required cooling capacity without the problems associated with cryogenic fuels. The primary products of the endothermic reaction are gaseous fuels with short ignition delay times and rapid burning rates. In addition, waste heat absorbed by the fuel can be returned to the system, enhancing performance and system efficiency.

However, the decomposition of hydrocarbon fuel at elevated temperatures leads to coke deposition within the fuel passages. Coke typically consists of approximately 80% to 95% carbon by weight with the balance comprising sulfur, nitrogen, inorganic materials, ash, and small amounts of oxygen. The coke deposits which form in the heat exchangers, reactors, and on the fuel system component walls degrade heat transfer and fuel flow characteristics and, if left unchecked, can lead to system failure. The extent to which the benefits of high endothermic hydrocarbon fuel cooling technology can be realized is thus directly related to the ability to mitigate against coke formation.

BRIEF SUMMARY OF THE INVENTION

A system removes coke deposits from the walls of a high temperature passage in which hydrocarbon fuel is present. The system includes a carbon-steam gasification catalyst and a water source. The carbon-steam gasification catalyst is applied to the walls of the high temperature passage. The steam from the water source reacts with the coke deposits on the walls of the high temperature passage to remove the coke deposits from the walls of the high temperature passage by carbon-steam gasification in the presence of the carbon-steam gasification catalyst.

DETAILED DESCRIPTION

Figure 1:
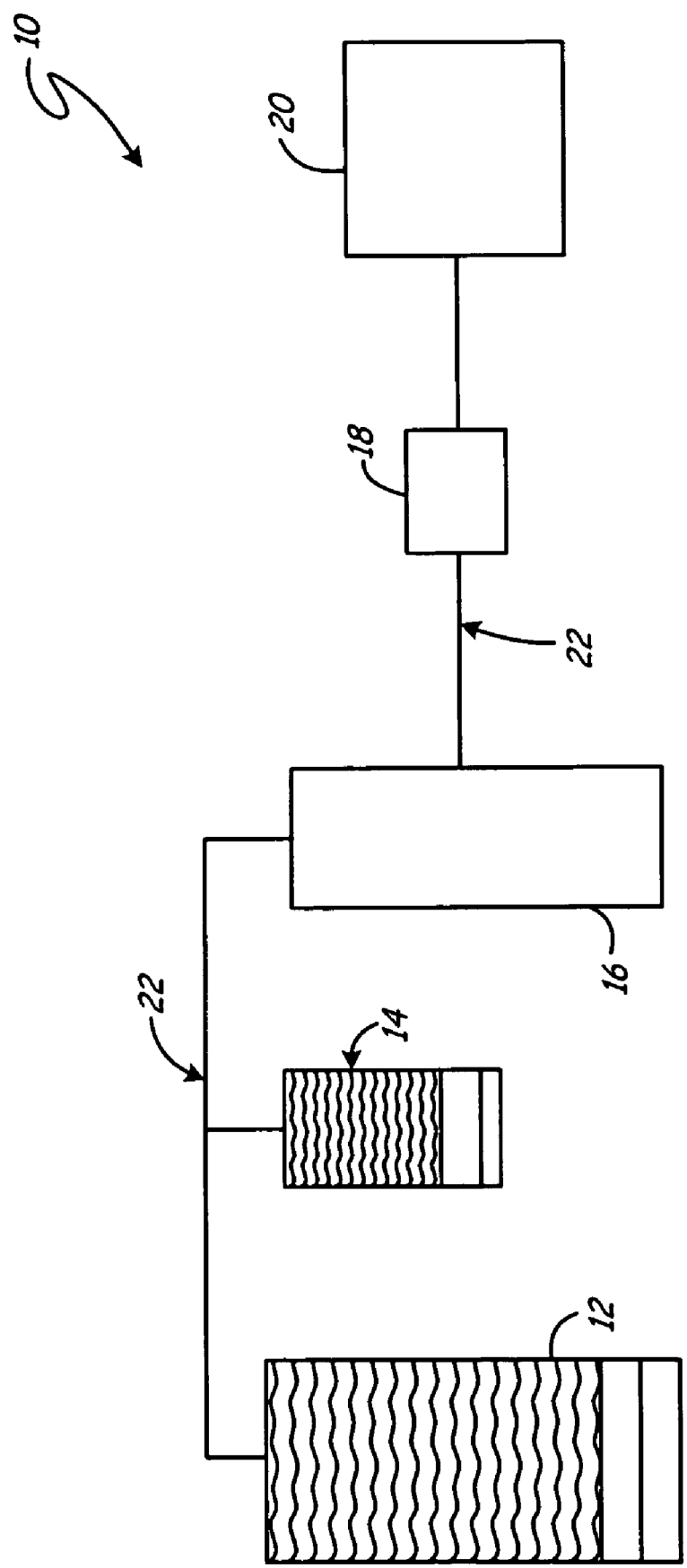
FIG. 1 is a block diagram of a high temperature system using high heat sink fuel cooling technology.

FIG. 1 shows a block diagram of high temperature system 10 using high heat sink fuel cooling technology with catalytic carbon-steam gasification coke removal. High temperature system 10 can be any system requiring high operating temperatures, such as a gas turbine or a hypersonic scramjet. High temperature system 10 generally includes fuel reservoir 12, water or steam supply system 14, heat exchanger 16, injector 18, combuster 20, and piping 22. Hydrocarbon fuel is stored in fuel reservoir 12 and is pumped to heat exchanger 16 through piping 22 when needed. After the hydrocarbon fuel has been reacted, it is passed through injector 18 to combuster 20. Combuster 20 provides power, or propulsion, to high temperature system 10.

Hydrocarbon fuel flows through high temperature system 10 and can be any type of hydrocarbon, including any hydrocarbon fuel that is susceptible to coking at elevated temperatures such as gas turbine fuels and other kerosene-type hydrocarbon fuels. For example, in space and rocket applications, the hydrocarbon fuels discussed above include methane. At high temperatures, the hydrocarbon fuel flowing through heat exchanger 16 can crack, depositing coke within the walls of heat exchanger 16 and downstream of heat exchanger 16. High temperature system 10 removes coke deposits through catalytic carbon-steam gasification. Catalytic carbon-steam gasification provides a cost-effective and simple solution for removing coke deposits from high temperature system 10, thereby increasing hydrocarbon fuel cooling capacity. This in turn extends the life and/or runtime of high temperature system 10. The addition of water/steam to the hydrocarbon fuel flowing through heat exchanger 16 also enhances combustion efficiency, lowers the lowest-minimum fuel temperature for operability, and reduces emissions.

Heat exchanger 16 of high temperature system 10 operates at temperatures of at least 700 degrees Fahrenheit (° F.), and preferably at temperatures of at least 900° F. At these temperatures, the carbon-carbon bonds of the hydrocarbon fuel break, absorbing heat. The hydrocarbon fuel passing through high temperature system 10 is used to cool the heat transfer medium flowing through heat exchanger 16, such as compressed, high temperature air, or to cool a structure, such as the walls of combuster 20 or high temperature surfaces of a vehicle. Thus, the hydrocarbon fuel is used as a heat sink or a cooling source to meet the cooling requirements of high temperature system 10.

Figure 2:
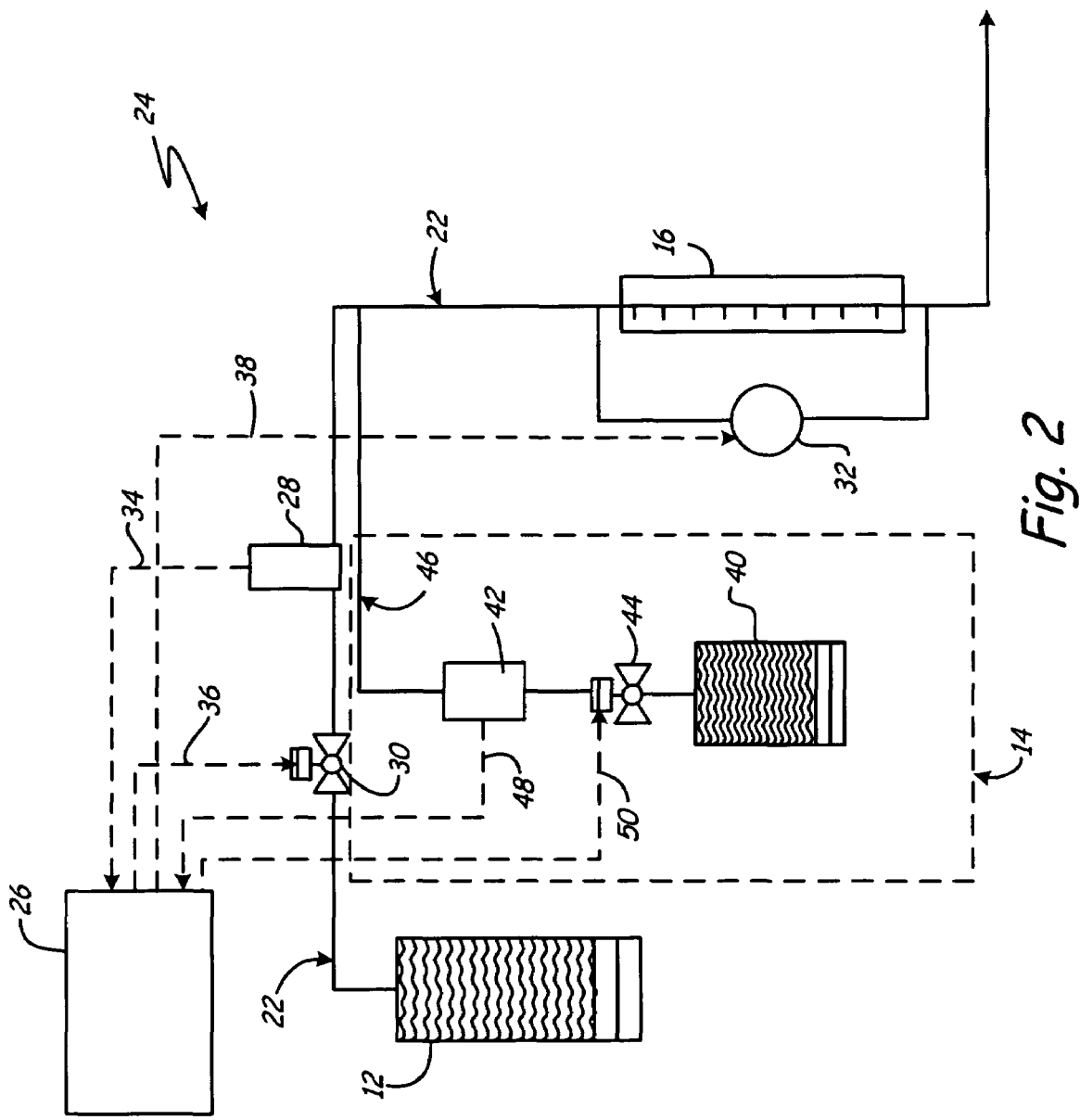
FIG. 2 is a schematic view of an intermediate portion of the high temperature system.

FIG. 2 shows a more detailed schematic view of an intermediate portion 24 of high temperature system 10 (shown in FIG. 1). Intermediate portion 24 of high temperature system 10 generally includes fuel reservoir 12, water supply system 14, heat exchanger 16, computer control system 26, hydrocarbon fuel flow meter 28, hydrocarbon fuel flow controller 30, and DC power supply 32. As previously mentioned, hydrocarbon fuel is pumped from fuel reservoir 12 to heat exchanger 16 when needed. Flow meter 28 is located downstream of fuel reservoir 12 and measures the flow rate of hydrocarbon fuel flowing from fuel reservoir 12. The measurement is sent through hydrocarbon flow signal line 34 to computer control system 26 where it is compared to a predetermined target flow rate. Computer control system 26 then sends a signal to flow controller 30 through hydrocarbon flow control line 36 to adjust the flow rate of hydrocarbon fuel from fuel reservoir 12 to the desired flow rate. In one embodiment, flow controller 30 is a flow valve.

Direct current is supplied to heat exchanger 16 from DC power supply 32 through power line 38, which is controlled by computer control system 26. As the hydrocarbon fuel is passed through heat exchanger 16, it undergoes the desired reaction. For example, the carbon-carbon bonds of the hydrocarbon fuel are broken to produce smaller molecules that will more readily burn in combuster 20 (shown in FIG. 1). The volume of hydrocarbon fuel in heat exchanger 16 and the wall surface temperatures of heat exchanger 16 can be measured by performing an energy balance, determined by the energy balance equation:

$$Q_{heat\ sink} = Q_{input} - Q_{loss}$$

where $Q_{heat\ sink}$ is the heat sink of the hydrocarbon fuel that flows through heat exchanger 16, $Q_{input}$ is the energy put into heat exchanger 16 by DC power supply 32, and $Q_{loss}$ is the energy lost to the surroundings.

Water/steam supply system 14 generally includes water reservoir 40, water flow meter 42, water flow controller 44, and piping 46. Water is stored in water reservoir 40 and is transported through piping 46 to piping 22 of high temperature system 10 upstream of heat exchanger 16. The water is combined with the hydrocarbon fuel flowing through piping 22 of high temperature system 10 upstream of heat exchanger 16. Similar to high temperature system 10, the flow rate of the water flowing from water reservoir 40 is measured by water flow meter 42, which sends a signal back to computer control system 26 via water flow signal line 48. Computer controller system 26 then sends a signal through water flow control line 50 to water flow controller 44. The flow rate of the water flowing to heat exchanger 16 is adjusted by flow controller 44 depending on the needs of heat exchanger 16. The hydrocarbon fuel and water are thus combined and introduced into heat exchanger 16 simultaneously as one fluid. In one embodiment, the water constitutes approximately 10% of the total weight of the hydrocarbon fuel and water combined. The water preferably constitutes approximately 5% of the total weight of the hydrocarbon fuel and water combined, a more preferably constitutes approximately 2% of the total weight of the hydrocarbon fuel and water combined, and most preferably constitutes approximately 1% of the total weight of the hydrocarbon fuel and water combined.

Figure 3:
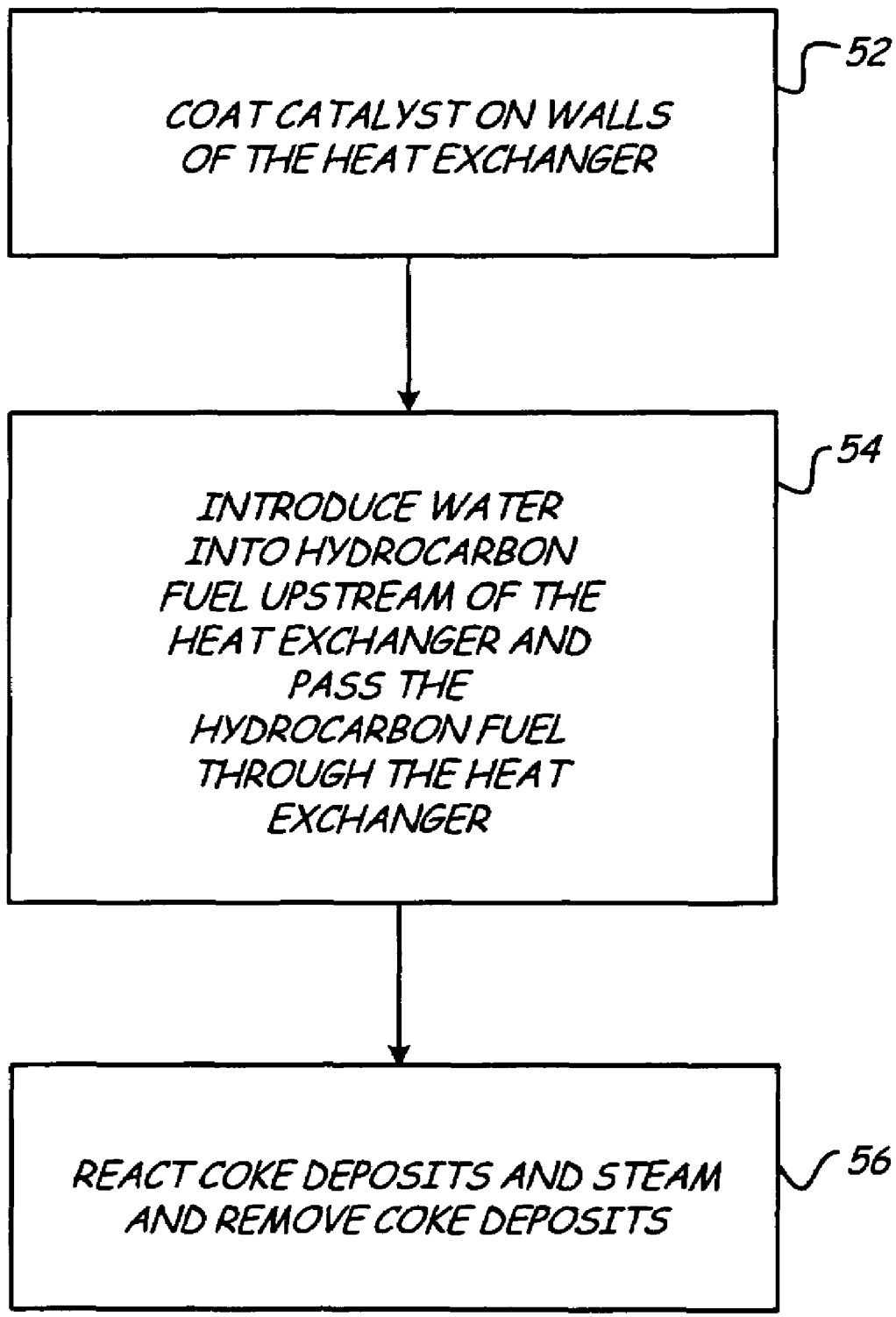
FIG. 3 is a diagram of a method of removing coke deposits from the walls of the high temperature system.

FIG. 3 shows a diagram of a method of removing coke deposits from the walls of the heat exchanger 16. A catalyst is first coated on the walls of heat exchanger 16, Box 52. Hydrocarbon fuel is passed through heat exchanger 16 and the flow rate of the fuel is measured and adjusted as necessary, Box 54. As shown in Box 54, water is introduced into the hydrocarbon fuel upstream of heat exchanger 16. The flow rate of the steam is also measured such that it can be adjusted as necessary to remove the coke deposits from the walls of heat exchanger 16 without over-diluting the hydrocarbon fuel. As the hydrocarbon fuel and the water pass through heat exchanger 16, the steam reacts with the coke deposits on the walls of heat exchanger 16, converting the coke and steam to hydrogen and carbon monoxide to be used as fuel downstream in combuster 20. The coke deposits are thus removed from the walls of heat exchanger 16 through catalytic carbon-steam gasification, Box 56. Although FIG. 3 describes removing coke deposits from heat exchanger 16, coke deposits can also be removed from other high temperature passages of high temperature system 10 where coke may deposit, such as a fuel nozzle or a fuel valve.

Figure 4:
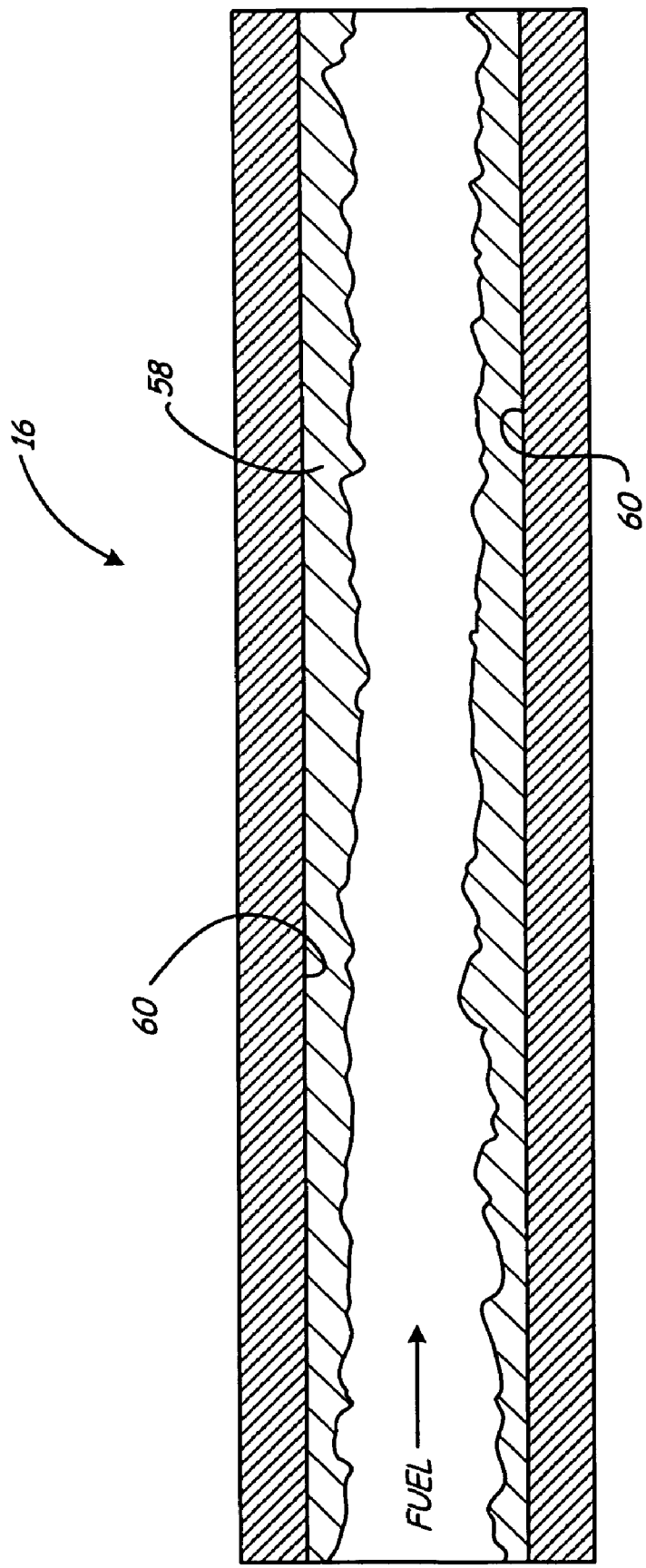
FIG. 4 is a partial cross-sectional view of walls of the high temperature system with coke deposits.

FIG. 4 shows an enlarged, partial cross-sectional view of heat exchanger 16. At high operating temperatures, hydrocarbon fuel is not stable and deposits coke 58, or carbon-rich deposits, on wall surfaces 60 of heat exchanger 16 through which the hydrocarbon fuel passes. As hydrocarbon fuel flows through heat exchanger 16, coke deposits 58 continue to build on wall surfaces 60 of heat exchanger 16. If left unchecked, coke deposits 58 can cause damage and lead to failure of high temperature system 10 (shown in FIG. 1). To prevent failure of high temperature system 10, coke deposits 58 must be removed from high temperature passages of high temperature system 10.

Figure 5:
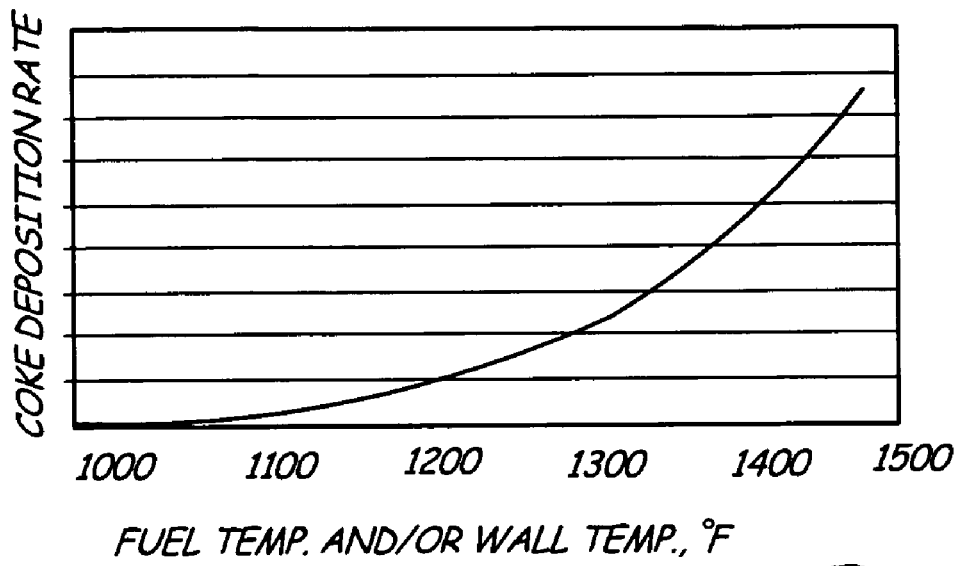
FIG. 5 is a graph showing rate of coke deposition on a wall of the high temperature system as a function of temperature.

FIG. 5 is a graph showing the rate of coke deposition on the walls of a high temperature system as a function of temperature. Coke deposition rates depend on bulk fuel temperatures as well as wall surface temperatures. As can be seen in FIG. 5, at high temperatures, coke deposition rates increase exponentially with increasing temperature. The highest coke deposition rates will therefore occur at surfaces where the temperature is highest. A benefit of using catalytic carbon-steam gasification to remove coke deposits on wall surfaces is that the reaction rate of catalytic carbon-steam gasification increases as the temperature of the wall surface increases. Thus, as the temperature inside high temperature system 10 increases and the rate of coke deposition increases, the rate of coke removal by catalytic carbon-steam gasification will also increase.

Figure 6:
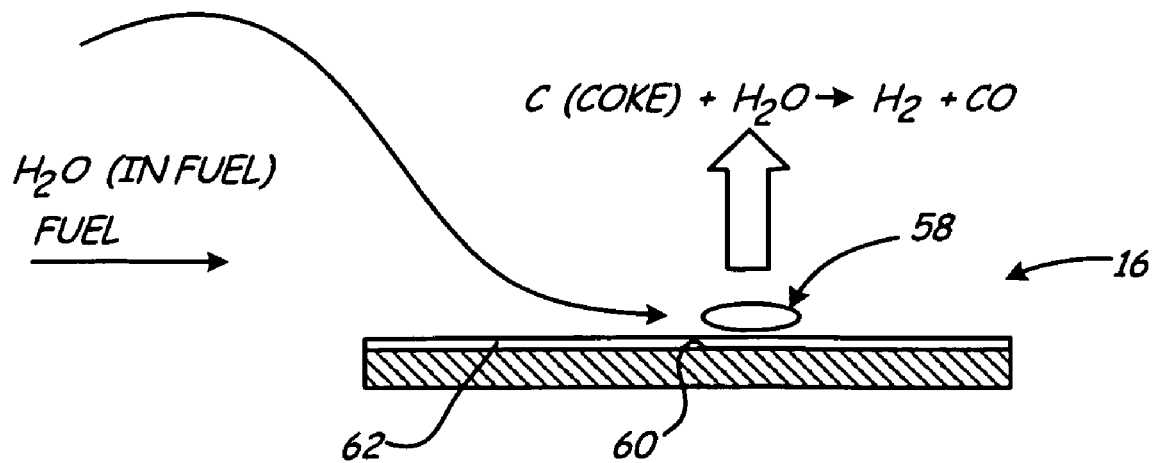
FIG. 6 is an enlarged schematic view of a coke deposit on the wall of the high temperature system and the steam gasification reaction at the wall of the high temperature system for removing the coke deposit.

FIG. 6 shows an enlarged schematic view of a coke deposit 58 on a wall surface 60 of heat exchanger 16 and the chemical reaction at wall surface 60 during catalytic carbon-steam gasification. Prior to passing the hydrocarbon fuel through heat exchanger 16, a catalyst 62 is coated on wall surfaces 60 of heat exchanger 16. Catalyst 62 acts to catalize the reaction of coke with the steam introduced by water supply system 14 (shown in FIG. 1). Examples of steam gasification catalysts include, but are not limited to: alkaline metal salts and alkali earth metal salts. Examples of alkaline metal salts include the IA group of the periodic table of elements, such as $Na_2CO_3$, $K_2CO_3$, $Cs_2CO_3$. Examples of alkali earth metal salts include the IIA group of the periodic table of elements, such as $MgCO_3$, $CaCO_3$, $SrCO_3$, $BaCO_3$.

Coke deposits 58 are removed from wall surfaces 60 coated with catalyst 62 by adding small amounts of water to the hydrocarbon fuel stream. The water is added to the hydrocarbon fuel before the hydrocarbon fuel passes through heat exchanger 16. As the fuel and steam pass through high temperature system 10, coke deposits 58 react with the steam through catalytic carbon-steam gasification, producing hydrogen and carbon monoxide:

$$C(coke) + H_2O \rightarrow H_2 + CO$$

Catalytic steam gasification of coke is a very strong endothermic reaction, increasing the overall heat sink capability of the hydrocarbon fuel. The endothermic reaction absorbs heat in heat exchanger 16 to cool the heat transfer medium flowing through heat exchanger 16 or to cool a structure, preventing the temperature of high temperature system 10 from reaching damaging levels. Additionally, the products of the catalytic carbon-steam gasification reaction can also be used as fuel. Carbon monoxide and hydrogen gas have short ignition times and are easily burned in combuster 20. Thus, using the products of the reaction as fuel increases the efficiency of high temperature system 10.

The system of the present invention removes coke deposits from high temperature systems using a catalyst, hydrocarbon fuel, and water. The catalyst is coated on the walls of the high temperature passage prior to passing hydrocarbon fuel through the high temperature passage. Water is introduced into the hydrocarbon fuel stream upstream of the high temperature passage and is introduced into the high temperature passage simultaneously with the hydrocarbon fuel. The steam reacts with the coke deposits through catalytic steam gasification to produce hydrogen and carbon monoxide, removing the coke deposits from the walls of the high temperature chamber. The carbon monoxide and hydrogen are subsequently used as fuel when the hydrocarbon fuel is combusted. The endothermic catalytic carbon-steam gasification reaction also serves to cool the high temperature passage, using the hydrocarbon fuel as a heat sink.

Although the present invention has been described with reference to preferred embodiments, workers skilled in the art will recognize that changes may be made in form and detail without departing from the spirit and scope of the invention.

The invention claimed is:

1. A method of preventing coke deposits on walls of a heat exchanger in an engine system, the method comprising the sequential steps of:
   (a) substantially coating the walls of the heat exchanger with a layer of carbon-steam gasification catalyst;
   (b) after step (a), combining hydrocarbon fuel and water to form a hydrocarbon fuel-water stream prior to entering the heat exchanger; and
   (c) after step (b), passing the hydrocarbon fuel-water stream through the heat exchanger prior to delivery to a combustor of the engine system; wherein the hydrocarbon fuel-water stream reacts with the layer of said catalyst such that coke deposits are prevented from remaining on the walls of the heat exchanger.

2. The method of claim 1, wherein the hydrocarbon fuel-water stream comprises between approximately 1 percent and approximately 10 percent water by weight.

3. The method of claim 1, wherein the layer of said catalyst is selected from the group consisting of: alkaline metal salts, alkali earth metal salts, and combinations thereof.

4. The method of claim 1, wherein the heat exchanger operates at a temperature of at least 700 degrees Fahrenheit.

5. A method of claim 2 wherein the hydrocarbon fuel-water stream constitutes approximatley 5 percent water by weight.

6. The method of claim 2, wherein the hydrocarbon fuel-water stream.

7. The method of claim 2, wherein the hydrocarbon fuel-water stream constitutes approximately 1 percent water by weight.

8. The method of claim 3, wherein the carbon-steam gasification catalyst is selected from the group consisting of $Na_2CO_3$, $K_2C_3$, $Cs_2CO_3$, $MgCO_3$, $CaCO_3$, $SrCO_3$, and $BaCO_3$.

9. The method of claim 4, wherein the heat exchanger operates at a temperature of at least 900 degrees Fahrenheit.

10. A method of preventing coke deposits on walls of a heat exchanger, the method comprising the sequential steps of:
    (a) coating walls of a heat exchanger with a carbon-stream gasification catalyst;
    (b) after step (a), combining hydrocarbon fuel and water to form a hydrocarbon fuel-water stream before the hydrocarbon fuel-water stream enters the heat exchanger;
    (c) after step (b), passing the hydrocarbon fuel-water stream through the heat exchanger, wherein a reaction occurs between the hydrocarbon fuel-water stream and the catalyst such that coke deposits are continuously removed from the heat exchanger and the reaction produces carbon monoxide and hydrogen gas which are added to the hydrocarbon fuel-water stream; and
    (d) after step (c), passing the hydrocarbon fuel-water stream through an injector into a combustor, wherein the hydrocarbon fuel, the carbon monoxide and the hydrogen gas are burned.

11. The method of claim 10 wherein the hydrocarbon fuel-water stream constitutes between approximately 1 percent and approximately 10 percent water by weight.

12. The method of claim 10 wherein the heat exchanger operates at a temperature of at least 700 degrees Fahrenheit.

13. The method of claim 10 wherein the carbon-steam gasification catalyst is selected from the group consisting of: alkaline metal salts, alkali earth metal salts, and combinations thereof.

14. The method of claim 11 wherein the hydrocarbon fuel-water stream constitutes between approximately 1 percent and 5 percent water by weight.

15. The method of claim 12, wherein the heat exchanger operates at a temperature of at least 900 degrees Fahrenheit.

16. The method of claim 13, wherein the carbon-steam gasification catalyst is selected from the group consisting of $Na_2CO_3$, $K_2CO_3$, $Cs_2CO_3$, $MgCO_3$, $CaCO_3$, $SrCO_3$, and $BaCO_3$.

17. The method of claim 14, wherein the hydrocarbon fuel-water stream constitutes approximately 5 percent water by weight.

18. The method of claim 14, wherein the hydrocarbon fuel-water stream constitutes approximately 2 percent water by weight.

19. The method of claim 14, wherein the hydrocarbon fuel-water stream constitutes approximately 1 percent water by weight.

* * * * *

UNITED STATES PATENT AND TRADEMARK OFFICE
CERTIFICATE OF CORRECTION

| | | |
|---|---|---|
| PATENT NO. | : 7,513,260 B2 | Page 1 of 1 |
| APPLICATION NO. | : 11/431810 | |
| DATED | : April 7, 2009 | |
| INVENTOR(S) | : He Huang | |

It is certified that error appears in the above-identified patent and that said Letters Patent is hereby corrected as shown below:

Column 5, Line 40, Claim 5, delete "A method", insert --The method--

Column 5, Line 43, Claim 6, delete "stream.", insert --stream constitutes approximately 2 percent water by weight--

Column 5, Line 49, Claim 8, delete "$K_2C_3$", insert --$K_2CO_3$--

Signed and Sealed this

Twenty-eighth Day of September, 2010

David J. Kappos
*Director of the United States Patent and Trademark Office*